(12) United States Patent
Jo et al.

(10) Patent No.: US 11,142,697 B2
(45) Date of Patent: Oct. 12, 2021

(54) LIQUID CRYSTAL ALIGNING AGENT COMPOSITION, METHOD FOR PRODUCING LIQUID CRYSTAL ALIGNMENT FILM USING SAME, AND LIQUID CRYSTAL ALIGNMENT FILM USING SAME

(71) Applicant: LG CHEM, LTD., Seoul (KR)

(72) Inventors: Jung Ho Jo, Daejeon (KR); Hee Han, Daejeon (KR); Sung Joon Min, Daejeon (KR); Hang Ah Park, Daejeon (KR); Sang Mi Lee, Daejeon (KR); Soon Ho Kwon, Daejeon (KR); Jun Young Yoon, Daejeon (KR); Hyeong Seuk Yun, Daejeon (KR); Seongku Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/484,402

(22) PCT Filed: Jun. 26, 2018

(86) PCT No.: PCT/KR2018/007242
§ 371 (c)(1),
(2) Date: Aug. 7, 2019

(87) PCT Pub. No.: WO2019/004709
PCT Pub. Date: Jan. 3, 2019

(65) Prior Publication Data
US 2019/0390116 A1    Dec. 26, 2019

(30) Foreign Application Priority Data

Jun. 29, 2017 (KR) .................. 10-2017-0082776

(51) Int. Cl.
| | | |
|---|---|---|
| C09K 19/56 | (2006.01) | |
| C08G 59/50 | (2006.01) | |
| C08L 63/00 | (2006.01) | |
| C08L 79/08 | (2006.01) | |
| G02F 1/1337 | (2006.01) | |

(52) U.S. Cl.
CPC ............ *C09K 19/56* (2013.01); *C08G 59/506* (2013.01); *C08L 63/00* (2013.01); *C08L 79/08* (2013.01); *G02F 1/1337* (2013.01); *C09K 2323/00* (2020.08); *C09K 2323/02* (2020.08)

(58) Field of Classification Search
CPC .............. C09K 19/56; C09K 2323/00; C09K 2323/02; C08G 59/506; C08L 63/00; C08L 79/08; G02F 1/1337; G02F 1/133711; G02F 1/133723

USPC ....... 428/1.1, 1.2, 1.26; 349/123; 252/299.4; 528/353; 525/449; 524/249

See application file for complete search history.

(56) References Cited

U.S. PATENT DOCUMENTS

| | | |
|---|---|---|
| 4,837,299 A | 6/1989 | Peters et al. |
| 5,789,524 A | 8/1998 | Hsu et al. |
| 2010/0213423 A1 | 8/2010 | Shiau et al. |
| 2010/0243955 A1 | 9/2010 | Tsai et al. |
| 2012/0172542 A1 | 7/2012 | Tsai |
| 2014/0323628 A1 | 10/2014 | Jeol et al. |
| 2015/0056544 A1 | 2/2015 | Miyake et al. |
| 2017/0038642 A1 | 2/2017 | Bae et al. |

FOREIGN PATENT DOCUMENTS

| | | |
|---|---|---|
| EP | 0274603 A1 | 7/1988 |
| JP | 1996-059832 A | 3/1996 |
| JP | 2003-008157 A | 1/2003 |
| JP | 2008-015497 A | 1/2008 |
| JP | 2011-059646 A | 3/2011 |
| JP | 2015-040950 A | 3/2015 |
| JP | 5768926 B2 | 8/2015 |
| JP | 6007809 B2 | 10/2016 |
| KR | 10-2001-0006371 A | 1/2001 |
| KR | 10-2009-0071448 A | 7/2009 |
| KR | 10-2013-0091866 A | 8/2013 |
| KR | 10-2013-0101440 A | 9/2013 |
| KR | 10-2014-0027245 A | 3/2014 |
| KR | 10-2014-0052241 A | 5/2014 |
| KR | 10-2016-0095801 A | 8/2016 |
| KR | 10-1648745 B1 | 8/2016 |
| KR | 10-2017-0016541 A | 2/2017 |
| TW | 200634378 A | 10/2006 |
| TW | 201245331 A | 11/2012 |
| TW | 201604237 A | 2/2016 |

OTHER PUBLICATIONS

International Search Report & Written Opinion issued for International Application No. PCT/KR2018/007242 dated Oct. 10, 2018, 9 pages.

*Primary Examiner* — Ruiyun Zhang
(74) *Attorney, Agent, or Firm* — Rothwell, Figg, Ernst & Manbeck, P.C.

(57) ABSTRACT

The present invention relates to a liquid crystal aligning agent composition capable of securing a high imidization rate under relatively mild curing conditions, minimizing side reactions and thus having excellent stability, a method for producing a liquid crystal alignment film using the same, and a liquid crystal alignment film and a liquid crystal display device using the same.

19 Claims, No Drawings

LIQUID CRYSTAL ALIGNING AGENT COMPOSITION, METHOD FOR PRODUCING LIQUID CRYSTAL ALIGNMENT FILM USING SAME, AND LIQUID CRYSTAL ALIGNMENT FILM USING SAME

CROSS-REFERENCE TO RELATED APPLICATION

This application is a 35 U.S.C. § 371 National Phase Entry Application from PCT/KR2018/007242, filed on Jun. 26, 2018, and designating the United States, which claims priority to and the benefits of Korean Patent Application No. 10-2017-0082776 filed with the Korean Intellectual Property Office on Jun. 29, 2017, the disclosures of which are incorporated herein by reference in their entirety.

TECHNICAL FIELD

The present invention relates to a liquid crystal aligning agent composition capable of securing a high imidization rate under relatively mild curing conditions, and minimizing side reactions and thus having excellent stability, a method for producing a liquid crystal alignment film using the same, and a liquid crystal alignment film and a liquid crystal display device using the same.

BACKGROUND ART

In a liquid crystal display device, a liquid crystal alignment film plays a role of aligning liquid crystals in a certain direction. Specifically, a liquid crystal alignment film serves as a director in the arrangement of liquid crystal molecules, and thus, when the liquid crystals move by an electric field to form an image, it helps them to move in an appropriate direction. In order to obtain uniform brightness and a high contrast ratio in a liquid crystal display device, it is essential that the liquid crystals are uniformly aligned.

As one of conventional methods for aligning a liquid crystal, a rubbing method of coating a polymer film such as a polyimide onto a substrate such as glass and rubbing the surface thereof in a predetermined direction using fibers such as nylon or polyester has been used. However, the rubbing method may cause serious problems during manufacture of a liquid crystal panel because fine dust or electrostatic discharge (ESD) may occur when the fiber and polymer film are rubbed.

In order to solve the problems of the rubbing method, a photo-alignment method of inducing anisotropy in a polymer film by light irradiation rather than the rubbing, and aligning liquid crystals using the anisotropy, has been recently studied.

As materials that can be used for the photo-alignment method, various materials have been introduced, among which polyimide is mainly used for various superior performances of liquid crystal alignment films. However, polyimide is poor in solubility in a solvent, so it is difficult to apply it directly to a manufacturing process of forming an alignment film by coating in a solution state.

Accordingly, after coating in the form of a precursor such as a polyamic acid or a polyamic acid ester having excellent solubility, a heat treatment process is performed at a temperature of 200° C. to 230° C. to form a polyimide, which is then subjected to light irradiation to align liquid crystals.

However, the polyamic acid containing a cyclic structure cannot achieve sufficient imidization in the above temperature range, and thus has a limitation in that stability and electrical characteristics as an alignment film are insufficient.

In order to solve this problem, a method of raising the temperature of the heat treatment process to a high temperature of 300° C. or higher has been studied, but it was difficult to apply it in the manufacturing process of a liquid crystal display device to which an alignment film is applied.

Therefore, there is a need to develop a liquid crystal aligning agent composition capable of having a high imidization rate even when applied to a general manufacturing process of liquid crystal alignment film.

DETAILED DESCRIPTION OF THE INVENTION

Technical Problem

It is an object of the present invention to provide a liquid crystal aligning agent composition capable of securing a high imidization rate under relatively mild curing conditions, and minimizing side reactions and thus having excellent stability.

It is another object of the present invention to provide a method for producing a liquid crystal alignment film using the above-described liquid crystal aligning agent composition.

It is a further object of the present invention to provide a liquid crystal alignment film prepared by the above-described production method, and a liquid crystal display device including the same.

Technical Solution

In order to achieve the above objects, the present invention provides a liquid crystal aligning agent composition including: i) a first polymer for a liquid crystal aligning agent including two or more repeating units selected from the group consisting of a repeating unit represented by the following Chemical Formula 1, a repeating unit represented by the following Chemical Formula 2, and a repeating unit represented by the following Chemical Formula 3, wherein the first polymer includes the repeating unit represented by Chemical Formula 1 in an amount of 5 to 74 mol % with respect to a total of the repeating units represented by the following Chemical Formulae 1 to 3, ii) a second polymer for a liquid crystal aligning agent including a repeating unit represented by the following Chemical Formula 4, iii) a compound having two or more epoxy groups in a molecule, and iv) a catalyst including at least one selected from the group consisting of a cyclic tertiary amine compound having 1 to 10 hydroxy groups introduced therein, and a linear tertiary amine compound having 2 to 10 hydroxy groups introduced therein.

[Chemical Formula 1]

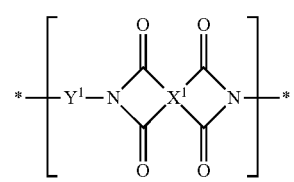

[Chemical Formula 2]

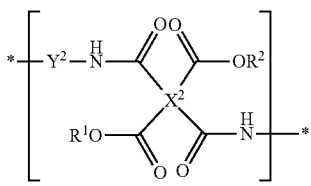

[Chemical Formula 3]

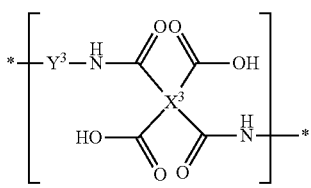

[Chemical Formula 4]

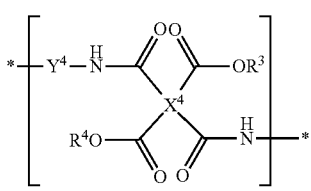

In Chemical Formulae 1 to 4, at least one of $R^1$ and $R^2$ is a $C_{1-10}$ alkyl, and the other is hydrogen, $R^3$ and $R^4$ are each independently hydrogen or a $C_{1-10}$ alkyl, and $X^1$ is a tetravalent organic group represented by the following Chemical Formula 5.

[Chemical Formula 5]

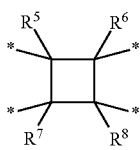

In Chemical Formula 5, $R^5$ to $R^8$ are each independently hydrogen or a $C_{1-6}$ alkyl, $X^2$, $X^3$, and $X^4$ are each independently a tetravalent organic group derived from a hydrocarbon having 4 to 20 carbon atoms, or a tetravalent organic group in which at least one H in the tetravalent organic group is substituted with a halogen, or at least one —$CH_2$— is replaced by —O—, —CO—, —S—, —SO—, —$SO_2$—, or —CONH— such that oxygen or sulfur atoms are not directly linked, and $Y^1$, $Y^2$, $Y^3$, and $Y^4$ are each independently a divalent organic group represented by the following Chemical Formula 6.

[Chemical Formula 6]

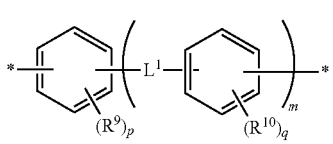

In Chemical Formula 6, $R^9$ and $R^{10}$ are each independently a halogen, a cyano, a $C_{1-10}$ alkyl, a $C_{2-10}$ alkenyl, a $C_{1-10}$ alkoxy, a $C_{1-10}$ fluoroalkyl, or a $C_{1-10}$ fluoroalkoxy, p and q are each independently an integer between 0 and 4, $L^1$ is a single bond, —O—, —CO—, —S—, —$SO_2$—, —$C(CH_3)_2$—, —$C(CF_3)_2$—, —CONH—, —COO—, —$(CH_2)_z$—, —$O(CH_2)_zO$—, —$O(CH_2)_z$—, —$OCH_2$—C$(CH_3)_2$—$CH_2O$—, —COO—$(CH_2)_z$—OCO—, or —OCO—$(CH_2)_z$—COO—, wherein z is an integer between 1 and 10, and m is an integer between 0 and 3, or between 1 and 3.

The liquid crystal aligning agent composition according to the present invention is characterized by including a compound having two or more epoxy groups in a molecule, and a catalyst including at least one selected from the group consisting of a cyclic tertiary amine compound having 1 to 10 hydroxy groups introduced therein and a linear tertiary amine compound having 2 to 10 hydroxy groups introduced therein, together with a first polymer for a liquid crystal aligning agent which is a partially imidized polyimide precursor, and a second polymer for a liquid crystal aligning agent, which is a general polyimide precursor.

When the existing polyimide is used as a liquid crystal alignment film, a polyimide precursor having excellent solubility, polyamic acid or a polyamic acid ester, are coated and dried to form a coating film, which is then converted into polyimide through a high-temperature heat treatment process, and then subjected to light irradiation to perform alignment treatment. However, in order to obtain sufficient liquid crystal alignment properties by subjecting the film in the form of polyimide to light irradiation, not only is a large amount of light irradiation energy required, but also an additional heat treatment process is undertaken for securing alignment stability after the light irradiation. Since the large amount of light irradiation energy and the additional high-temperature heat treatment process are very disadvantageous in view of the process cost and process time, a limitation in applying it to actual mass production process existed.

In this regard, the present inventors found through experiments that, when the first polymer for a liquid crystal aligning agent which essentially includes a repeating unit represented by Chemical Formula 1, and additionally includes at least one repeating unit selected from the group consisting of a repeating unit represented by Chemical Formula 2 and a repeating unit represented by Chemical Formula 3, and the second polymer for a liquid crystal aligning agent including a repeating unit represented by Chemical Formula 4, are mixed and used, the first polymer contains a certain amount of already imidized imide repeating units, and thus it is possible to produce anisotropy by directly irradiating the light without a heat treatment process after the formation of a coating film, followed by conducting a heat treatment to complete the alignment film, whereby not only can the light irradiation energy be significantly reduced, but also a liquid crystal alignment film having excellent alignment properties and stability as well as excellent voltage holding ratio and electrical properties can be produced.

Further, the present inventors found that in addition to the polymers for liquid crystal aligning agents, when a compound having two or more epoxy groups in a molecule is included in the liquid crystal aligning agent composition, a liquid crystal alignment film prepared therefrom can not only exhibit a high voltage holding ratio but also enhance the alignment stability due to heat stress and the mechanical strength of the alignment film. Without wishing to be bound by any theory, in the course of heat treatment after the production of anisotropy by light irradiation, a thermal crosslinking reaction occurs between the compound having an epoxy group and the carboxylic acid group of the polyimide precursor or the partially imidized polymer, thereby increasing the voltage holding ratio. In addition, since a compound having two or more epoxy groups in a molecule is used, in particular, not only are these properties further improved, but also the crosslinking reaction among the polyimide precursor or partially imidized polymer chains can occur, thereby improving the alignment stability and the mechanical strength of the alignment film.

In particular, the present inventors developed a liquid crystal aligning agent composition in which a catalyst of tertiary amines containing at least one hydroxyl group (—OH) is added to a polyamic acid or a polyamic acid ester corresponding to a polyimide precursor, and found through experiments that the polyimide conversion rate can be greatly improved as compared with a conventional one, thereby completing the present invention.

In the case of the amine catalyst conventionally used, a polyimide conversion rate could be secured to some extent, but there was a limitation in that, as a non-soluble substance is produced due to side reactions with the polyamic acid or polyamic acid ester corresponding to the polyimide precursor, the storage stability decreases, and for example, the viscosity of the liquid crystal aligning agent composition increases.

On the other hand, it has been found by the present inventors that, according to the present invention, as a cyclic tertiary amine compound having 1 to 10 hydroxy groups introduced therein or a linear tertiary amine compound having 2 to 10 hydroxy groups introduced therein, or a mixture thereof, is used as a catalyst, excellent physical properties of the alignment film can be secured by achieving excellent an imidization conversion rate as an amine catalyst, while ensuring storage stability by reducing the formation of substances due to side reactions as compared with the conventionally used catalysts of amines.

Hereinafter, the present invention will be described in more detail.

Definition of Terms

Unless specified otherwise herein, the following terms can be defined as follows.

Throughout the specification, when one part "includes" one constituent element, unless otherwise specifically described, this does not mean that another constituent element is excluded, but means that another constituent element may be further included.

The $C_{4-20}$ hydrocarbon may be a $C_{4-20}$ alkane, a $C_{4-20}$ alkene, a $C_{4-20}$ alkyne, a $C_{4-20}$ cycloalkane, a $C_{4-20}$ cycloalkene, a $C_{6-20}$ arene, or a fused ring in which at least one cyclic hydrocarbon among them shares two or more atoms, or a hydrocarbon to which at least one hydrocarbon among them is chemically bonded. Specifically, examples of the $C_{4-20}$ hydrocarbon may include n-butane, cyclobutane, 1-methylcyclobutane, 1,3-dimethylcyclobutane, 1,2,3,4-tetramethylcyclobutane, cyclopentane, cyclohexane, cycloheptane, cyclooctane, cyclohexene, 1-methyl-3-ethylcyclohexene, bicyclohexyl, benzene, biphenyl, diphenylmethane, 2,2-diphenylpropane, 1-ethyl-1,2,3,4-tetrahydronaphthalene, 1,6-diphenylhexane, etc.

The $C_{1-10}$ alkyl group may be a straight-chain, branched-chain, or cyclic alkyl group. Specifically, the $C_{1-10}$ alkyl group may be a straight-chain $C_{1-10}$ alkyl group; a straight-chain $C_{1-6}$ alkyl group; a branched-chain or cyclic $C_{3-10}$ alkyl group; or a branched-chain or cyclic $C_{3-6}$ alkyl group. More specifically, examples of the $C_{1-10}$ alkyl group may include a methyl group, an ethyl group, an n-propyl group, an iso-propyl group, an n-butyl group, an iso-butyl group, a tert-butyl group, an n-pentyl group, an iso-pentyl group, a neo-pentyl group, a cyclohexyl group, etc.

The $C_{1-10}$ alkoxy group may be a straight-chain, branched-chain, or cyclic alkoxy group. Specifically, the $C_{1-10}$ alkoxy group may be a straight-chain $C_{1-10}$ alkoxy group; a straight-chain $C_{1-5}$ alkoxy group; a branched-chain or cyclic $C_{3-10}$ alkoxy group; or a branched-chain or cyclic $C_{3-6}$ alkoxyl group. More specifically, examples of the $C_{1-10}$ alkoxy group may include a methoxy group, an ethoxy group, an n-propoxy group, an iso-propoxy group, an n-butoxy group, an iso-butoxy group, a tert-butoxy group, an n-pentoxy group, an iso-pentoxy group, a neo-pentoxy group, a cycloheptoxy group, etc.

The $C_{1-10}$ fluoroalkyl group may be a group in which at least one hydrogen in the $C_{1-10}$ alkyl group is substituted with fluorine, and the $C_{1-10}$ fluoroalkoxy group may be a group in which at least one hydrogen in the $C_{1-10}$ alkoxy group is substituted with fluorine.

The $C_{1-10}$ alkenyl group may be a straight-chain, branched-chain, or cyclic alkenyl group. Specifically, the $C_{1-10}$ alkenyl group may be a straight-chain $C_{2-10}$ alkenyl group, a straight-chain $C_{2-5}$ alkenyl group, a branched-chain $C_{3-10}$ alkenyl group, a branched-chain $C_{3-6}$ alkenyl group, a cyclic $C_{5-10}$ alkenyl group, or a cyclic $C_{6-8}$ alkenyl group. More specifically, examples of the $C_{2-10}$ alkenyl group may include an ethenyl group, a propenyl group, a butenyl group, a pentenyl group, a cyclohexenyl group, etc.

The halogen may be fluorine (F), chlorine (Cl), bromine (Br), or iodine (I).

The multivalent organic group derived from an arbitrary compound refers to a residue in which a plurality of hydrogen atoms bonded to the arbitrary compound are removed. In one example, a tetravalent organic group derived from cyclobutane refers to a residue in which any four hydrogen atoms bonded to cyclobutane are removed.

In the present specification, the notation

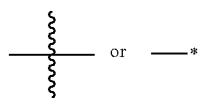

in the Chemical Formula refers to a residue in which hydrogens at the relevant site are removed. For example, the notation

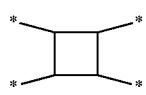

refers to a residue in which four hydrogen atoms bonded to carbon numbers 1, 2, 3, and 4 of cyclobutane are removed, that is, it refers to any one of tetravalent organic groups derived from cyclobutane.

In the present specification, a direct bond or a single bond refers to being linked to a bond line without existence of an atom or an atomic group at the relevant position. Specifically, it refers to a case where no additional atom exists in a portion represented by $L^1$ and $L^2$ in the Chemical Formula.

Polymer for Liquid Crystal Aligning Agent

The liquid crystal aligning agent composition may include, as a polymer for a liquid crystal aligning agent, i)

a first polymer for a liquid crystal aligning agent including two or more repeating units selected from the group consisting of a repeating unit represented by Chemical Formula 1, a repeating unit represented by Chemical Formula 2, and a repeating unit represented by Chemical Formula 3, wherein the first polymer includes the repeating unit represented by Chemical Formula 1 in an amount of 5 to 74 mol % with respect to all repeating units represented by Chemical Formulae 1 to 3, and ii) a second polymer for a liquid crystal aligning agent including a repeating unit represented by Chemical Formula 4.

In the repeating units of Chemical Formulae 1 to 4, $X^1$ is a tetravalent organic group represented by Chemical Formula 5, and $X^2$ to $X^4$ are each independently a tetravalent organic group derived from a hydrocarbon having 4 to 20 carbon atoms, or a tetravalent organic group in which at least one H in the tetravalent organic group is substituted with halogen, or at least one —$CH_2$— is replaced by —O—, —CO—, —S—, —SO—, —$SO_2$—, or —CONH— such that oxygen or sulfur atoms are not directly linked.

In one example, the $X^2$ to $X^4$ may each independently be a tetravalent organic group represented by the following Chemical Formula 7.

[Chemical Formula 7]

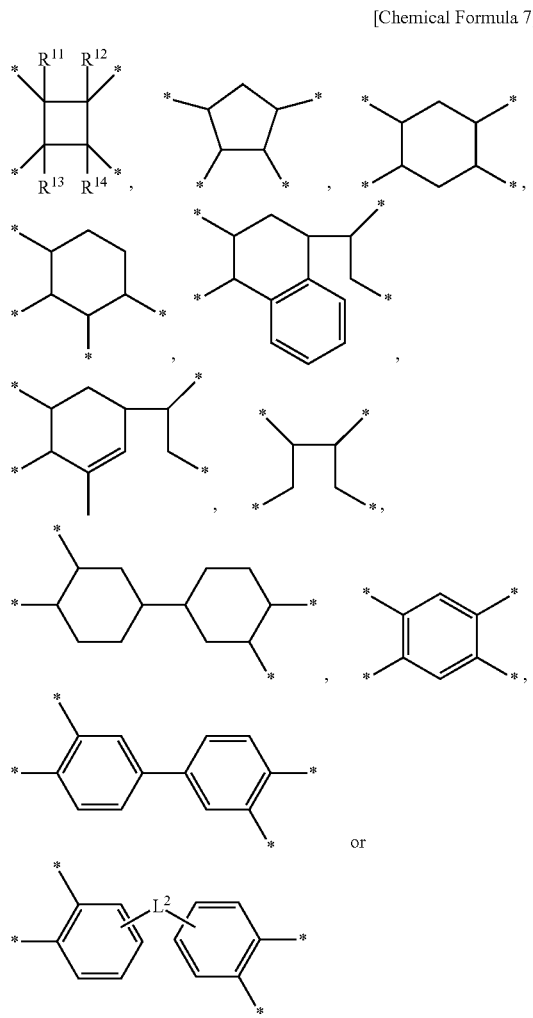

In Chemical Formula 7, $R^{11}$ to $R^{14}$ are each independently hydrogen or a $C_{1-6}$ alkyl, and $L^2$ is a single bond, —O—, —CO—, —S—, —$C(CH_3)_2$—, —$C(CF_3)_2$—, —CONH—, —COO—, —$(CH_2)_z$—, —$O(CH_2)_zO$—, or —COO—$(CH_2)_z$—OCO—, wherein z is an integer between 1 to 10.

On the other hand, $Y^1$ to $Y^4$ are each defined as a divalent organic group represented by Chemical Formula 6, which can provide a polymer for a liquid crystal aligning agent having various structures capable of exhibiting the above-described effects.

In Chemical Formula 6, hydrogen is bonded to a carbon which is not substituted with $R^9$ or $R^{10}$, and when p or q is an integer of 2 to 4, a plurality of $R^9$ or $R^{10}$ may be the same as or different from each other. Further, in Chemical Formula 6, m may be an integer of 0 to 3, or an integer of 0 or 1.

Specifically, the first polymer for a liquid crystal aligning agent may include the repeating unit represented by Chemical Formula 1, which is an imide repeating unit, in an amount of 10 mol % to 74 mol %, or 20 mol % to 60 mol %, based on all repeating units, among the repeating units represented by Chemical Formula 1, Chemical Formula 2, and Chemical Formula 3. As described above, when the first polymer for a liquid crystal aligning agent which includes a specific amount of the imide repeating unit represented by Chemical Formula 1 is used, the polymer includes a certain amount of already imidized imide repeating units, and thus, a liquid crystal alignment film having excellent alignment properties and stability as well as excellent voltage holding ratio and electrical properties can be produced even when the high-temperature heat treatment process is omitted and light is directly irradiated. If the repeating unit represented by Chemical Formula 1 is included at less than the content range, sufficient alignment properties may not be exhibited and alignment stability may be deteriorated. On the contrary, if the content of the repeating unit represented by Chemical Formula 1 exceeds the above content range, the solubility is lowered, and thus it may be difficult to prepare a stable alignment solution capable of coating, which is problematic. Accordingly, it is preferable to include the repeating unit represented by Chemical Formula 1 within the above-mentioned content range, because it can provide a polymer for a liquid crystal aligning agent having excellent storage stability, electrical properties, alignment properties, and alignment stability.

Further, the first polymer for a liquid crystal aligning agent may include the repeating unit represented by Chemical Formula 2 or the repeating unit represented by Chemical Formula 3 in an appropriate amount depending on the desired characteristics. Specifically, the repeating unit represented by Chemical Formula 2 may be included in an amount of 0 mol % to 40 mol %, 0 mol % to 30 mol %, or 0.1 mol % to 30 mol %, based on all repeating units represented by Chemical Formulae 1 to 3. The repeating unit represented by Chemical Formula 2 has a low imide conversion rate during the high-temperature heat treatment process after the light irradiation, and thus if the above range is exceeded, the overall imidization rate is insufficient, thereby deteriorating the alignment stability. Accordingly, the repeating unit represented by Chemical Formula 2 exhibits an appropriate solubility within the above-mentioned range and thus can provide a polymer for a liquid crystal aligning agent which can implement a high imidization rate while having excellent processing properties.

Moreover, in the first polymer for a liquid crystal aligning agent, the repeating unit represented by Chemical Formula 3 may be included in an amount of 0 mol % to 95 mol %, or 10 mol % to 90 mol %, based on all repeating units represented by Chemical Formulae 1 to 3. Within such a range, excellent coating properties can be exhibited, thereby providing a polymer for a liquid crystal aligning agent which can implement a high imidization rate while having excellent processing properties.

Meanwhile, the second polymer for a liquid crystal aligning agent is mixed with the first polymer for a liquid crystal aligning agent, which is a partially imidized polymer, and used as a liquid crystal aligning agent, and thus can significantly enhance the electrical properties of an alignment film such as voltage holding ratio as compared to the case where only the first polymer for a liquid crystal aligning agent is used.

In order to exhibit such an effect, it is preferable that $X^4$ in the repeating unit represented by Chemical Formula 4 is derived from an aromatic structure in view of improving the voltage holding ratio.

In addition, in the repeating unit represented by Chemical Formula 4, it is preferable that $Y^4$ is a bivalent organic group represented by Chemical Formula 6. Herein $R^9$ and $R^{10}$ are each independently a short-chain functional group having 3 or less carbon atoms, or it is more preferable that $R^9$ and $R^{10}$, which are branched structures, are not included (p and q are 0).

Preferably, the $X^2$, $X^3$, and $X^4$ are each independently a tetravalent organic group represented by the following Chemical Formula 7.

[Chemical Formula 7]

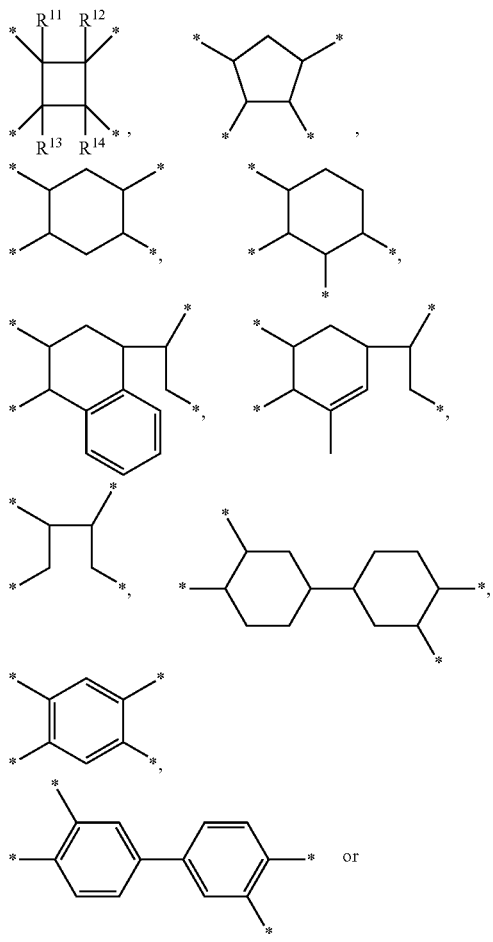

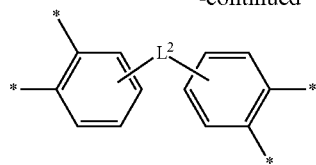

-continued

In Chemical Formula 7,
$R^{11}$ to $R^{14}$ are each independently hydrogen or a $C_{1-6}$ alkyl, and
$L^2$ is a single bond, —O—, —CO—, —S—, —C(CH$_3$)$_2$—, —C(CF$_3$)$_2$—, —CONH—, —COO—, —(CH$_2$)$_z$—, —O(CH$_2$)$_z$O—, or —COO—(CH$_2$)$_z$—OCO—, wherein z is an integer between 1 and 10.

Further, the first polymer for a liquid crystal aligning agent and the second polymer for a liquid crystal aligning agent may be mixed in a weight ratio of 1:9 to 9:1, 15:85 to 85:15, or 2:8 to 8:2. As described above, the first polymer for a liquid crystal aligning agent contains a certain amount of already imidized imide repeating units, and thus it is possible to produce anisotropy by directly irradiating the light without a high-temperature heat treatment process after the formation of the coating film, followed by conducting a heat treatment to complete the alignment film. The second polymer for a liquid crystal aligning agent can enhance the electrical properties such as voltage holding ratio. When the first polymer for a liquid crystal aligning agent and the second polymer for a liquid crystal aligning agent having such characteristics are mixed in the above weight ratio range and used, excellent photo-reaction characteristics and liquid crystal alignment properties that the first polymer for a liquid crystal aligning agent has and excellent electrical properties that the second polymer for a liquid crystal aligning agent has can complement each other, and thus a liquid crystal alignment film simultaneously having excellent alignment properties and electrical properties can be produced.

Compound Having Two or More Epoxy Groups in a Molecule

In addition to the polymers for liquid crystal aligning agents described above, the liquid crystal aligning agent composition of the present invention includes a compound having two or more epoxy groups in a molecule, thereby allowing a liquid crystal alignment film prepared therefrom to exhibit a high voltage holding ratio.

The molecular weight of the compound having two or more epoxy groups in a molecule may preferably be 100 g/mol to 10,000 g/mol. In the present specification, the molecular weight means a weight average molecular weight in terms of polystyrene measured by a GPC method. In the process of determining the weight average molecular weight in terms of polystyrene measured by the GPC method, a commonly known analyzing device, a detector such as a refractive index detector, and an analytical column can be used. Commonly applied conditions for temperature, solvent, and flow rate can be used. Specific examples of the measurement conditions include a temperature of 30° C., a chloroform solvent, and a flow rate of 1 mL/min.

As the compound having two or more epoxy groups in a molecule, cycloaliphatic-based epoxy, bisphenol-based epoxy, or novolac-based epoxy can be used. In such specific example, (3',4'-epoxycyclohexane)methyl 3,4-epoxycyclohexylcarboxylate, 4,4'-methylene bis(N,N'-diglycidyl aniline), or 2,2'-(3,3',5,5'-tetramethylbiphenyl-4,4'-diyl)bis(oxy)bis(methylene)dioxirane can be used.

In addition, the compound having two or more epoxy groups in the molecule is preferably included in an amount of 0.1 to 30 parts by weight based on a total of 100 parts by weight of the first polymer for a liquid crystal aligning agent and the second polymer for a liquid crystal aligning agent.

Catalyst

In addition to the polymers for liquid crystal aligning agents and the compound having two or more epoxy groups in the molecule described above, the liquid crystal aligning agent composition of one embodiment of the present invention includes a catalyst, thereby increasing an imidization rate of the liquid crystal alignment film prepared therefrom.

The catalyst may include a catalyst including at least one selected from the group consisting of (a) a cyclic tertiary amine compound having 1 to 10 hydroxy groups introduced therein, and (b) a linear tertiary amine compound having 2 to 10 hydroxy groups introduced therein. That is, (a) a cyclic tertiary amine compound having 1 to 10 hydroxy groups introduced therein, and (b) a linear tertiary amine compound having 2 to 10 hydroxy groups introduced therein, or a mixture thereof, can be used.

The catalyst compound is preferably included in an amount of 0.03 to 300 parts by weight, 0.1 to 100 parts by weight, 1 to 50 parts by weight, or 3 to 10 parts by weight, based on a total of 100 parts by weight of the first polymer for a liquid crystal aligning agent and the second polymer for a liquid crystal aligning agent described above.

First, the cyclic tertiary amine compound having 1 to 10, 1 to 4, or 1 to 2 hydroxy groups introduced therein is a compound in which 1 to 10, 1 to 4, or 1 to 2 hydroxy groups are substituted at the position of a hydrogen atom contained in a tertiary amine compound having a cyclic structure. Not only can it form a liquid crystal alignment film having a high imidization rate by inducing a reaction so as to convert polyamic acid or polyamic acid ester repeating units into polyimide repeating units, but it also inhibits a side reaction in which a non-soluble substance is formed, thereby improving the stability.

Specifically, the cyclic tertiary amine compound having 1 to 10 hydroxy groups introduced therein may include a nitrogen-containing heteroalicyclic compound in which 1 to 10 hydroxyalkyl groups are bonded to nitrogen. The hydroxyalkyl group refers to an alkyl group having a hydroxy group at the terminal, and a tertiary amine structure can be formed as the alkyl group part of the hydroxyalkyl group is bonded to a nitrogen atom contained in the nitrogen-containing heteroalicyclic compound.

The nitrogen-containing heteroalicyclic compound refers to a compound containing one or more, or one to three, nitrogen atoms as a hetero atom in the ring structure of the alicyclic compound, and specific examples thereof include piperidine.

More specifically, example of the nitrogen-containing heteroalicyclic compound in which 1 to 10 hydroxyalkyl groups are bonded to nitrogen include piperidine in which 1 to 4 hydroxyalkyl groups are bonded to nitrogen, and more preferably, (2-hydroxyethyl)piperidine can be used.

On the other hand, the linear tertiary amine compound having 2 to 10, or 2 to 4, hydroxy groups introduced therein is a compound in which 2 to 10, or 2 to 4 hydroxy groups are substituted at the position of a hydrogen atom contained in a tertiary amine compound having a linear structure. Likewise, not only can it form a liquid crystal alignment film having a high imidization rate by inducing a reaction so as to convert polyamic acid or polyamic acid ester repeating units into polyimide repeating units, but it also inhibits a side reaction in which a non-soluble substance is formed, thereby improving the stability.

Specifically, the linear tertiary amine compound having 2 to 10 hydroxy groups introduced therein may include an alkylene diamine compound in which 2 to 10 hydroxyalkyl groups are bonded to nitrogen. The hydroxyalkyl group refers to an alkyl group having a hydroxy group at the terminal, and a tertiary amine structure can be formed as the alkyl group part of the hydroxyalkyl group is bonded to a nitrogen atom contained in the alkylene diamine compound.

The alkylene diamine compound refers to a compound in which an amino group ($-NH_2$) is introduced at both terminals of an alkylene functional group, and specific examples thereof include ethylene diamine.

More specifically, examples of the alkylene diamine compound in which 2 to 10 hydroxyalkyl groups are bonded to nitrogen include ethylene diamine in which 2 to 4 hydroxyalkyl groups are bonded to nitrogen, and more preferably, N,N,N',N'-tetrakis(2-hydroxyethyl)ethylene diamine can be used.

Liquid Crystal Aligning Agent Composition

The liquid crystal aligning agent composition may have a viscosity change rate of 10% or less, or 1% to 10%, expressed by the following Mathematical Formula.

Viscosity change rate (%)=(Viscosity of the liquid crystal aligning agent composition after storage at room temperature for 30 days−Initial viscosity of the liquid crystal aligning agent composition)/Initial viscosity of the liquid crystal aligning agent composition*100. [Mathematical Formula]

Examples of the method of measuring the viscosity are not particularly limited, but for example, the viscosity can be determined by measuring an amount of torque using a Brookfield viscometer with an RV-7 spindle at a temperature of 25° C. and a rotational speed of 0.5 rpm.

Method for Producing Liquid Crystal Alignment Film

In addition, the present invention provides a method for producing a liquid crystal alignment film including the steps of: 1) coating the liquid crystal aligning agent composition onto a substrate to form a coating film; 2) drying the coating film; 3) subjecting the coating film to alignment treatment immediately after the drying step; and 4) heat-treating and curing the alignment-treated coating film.

When existing polyimide is used as a liquid crystal alignment film, a polyimide precursor (polyamic acid or a polyamic acid ester) having excellent solubility, are coated and dried to form a coating film, which is then converted into polyimide through a high-temperature heat treatment process, and then subjected to light irradiation to perform alignment treatment. However, in order to obtain sufficient liquid crystal alignment properties by subjecting the film in the form of polyimide to light irradiation, not only is a large amount of light irradiation energy required, but also an additional heat treatment process is undertaken for securing alignment stability after the light irradiation. Since the large amount of light irradiation energy and the additional high-temperature heat treatment process are very disadvantageous in view of the process cost and process time, a limitation in applying it to actual mass production process existed.

In this regard, the present inventors found through experiments that, when a polymer including two or more repeating units selected from the group consisting of a repeating unit represented by Chemical Formula 1, a repeating unit represented by Chemical Formula 2, and a repeating unit represented by Chemical Formula 3, and particularly including the repeating unit represented by Chemical Formula 1 among the above-described repeating units in an amount of 5 to 74 mol % is used, the polymer contains a certain amount of already imidized imide repeating units, and thus it is possible to produce anisotropy by directly irradiating the light without a heat treatment process after the formation of a coating film, followed by conducting a heat treatment to complete the alignment film, and thereby, not only can the light irradiation energy be significantly reduced, but also a liquid crystal alignment film having enhanced alignment properties and stability can be produced even by a simple process including one heat treatment step, thereby completing the present invention.

Hereinafter, the present invention will be described in detail for each step.

1) Coating the Liquid Crystal Aligning Agent Composition onto a Substrate to Form a Coating Film (Step 1)

Step 1 is a step of coating the liquid crystal aligning agent onto a substrate to form a coating film.

The liquid crystal aligning agent composition includes i) a first polymer for a liquid crystal aligning agent including two or more repeating units selected from the group consisting of a repeating unit represented by Chemical Formula 1, a repeating unit represented by Chemical Formula 2, and a repeating unit represented by Chemical Formula 3, wherein the first polymer includes the repeating unit represented by Chemical Formula 1 in an amount of 5 to 74 mol % with respect to all repeating unit represented by Chemical Formulae 1 to 3, ii) a second polymer for a liquid crystal aligning agent including a repeating unit represented by Chemical Formula 4, iii) a compound having two or more epoxy groups in a molecule, and iv) a catalyst including at least one selected from the group consisting of a cyclic tertiary amine compound having 1 to 10 hydroxy groups introduced therein, and a linear tertiary amine compound having 2 to 10 hydroxy groups introduced therein. The details of the liquid crystal aligning agent composition are the same as the contents described above.

Meanwhile, the method of coating the liquid crystal aligning agent composition onto a substrate is not particularly limited, and for example, a method such as screen printing, offset printing, flexographic printing, inkjet printing, and the like can be used.

Further, the liquid crystal aligning agent composition may be a composition in which the first polymer for a liquid crystal aligning agent, the second polymer for a liquid crystal aligning agent, the compound having two or more epoxy groups in a molecule, and the catalyst including at least one selected from the group consisting of a cyclic tertiary amine compound having 1 to 10 hydroxy groups introduced therein, and a linear tertiary amine compound having 2 to 10 hydroxy groups introduced therein, are dissolved or dispersed in an organic solvent. Specific examples of the organic solvent include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethyl sulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate, and the like. They can be used alone or in combination of two or more.

In addition, the liquid crystal aligning agent composition may further include other components in addition to the polymer for a liquid crystal aligning agent and the organic solvent. In a non-limiting example, when the liquid crystal aligning agent composition is coated, additives capable of improving the uniformity of the thickness of a film and the surface smoothness, improving the adhesion between a photo-alignment film and a substrate, changing the dielectric constant and conductivity of a photo-alignment film, or increasing the denseness of a photo-alignment film, may be further included. Examples of such additives include various kinds of solvents, surfactants, silane-based compounds, dielectrics, crosslinking compounds, etc.

2) Drying the Coating Film (Step 2)

Step 2 is a step of drying the coating film prepared in Step 1.

The step of drying the coating film is for removing a solvent or the like used in the liquid crystal aligning agent composition, and for example, a method such as heating of a coating film or vacuum evaporation may be used. The drying may be preferably performed at a temperature of 50° C. to 130° C., or at a temperature of 70° C. to 120° C.

3) Subjecting the Coating Film to Alignment Treatment Immediately after the Drying Step (Step 3)

Step 3 is a step of irradiating the coating film dried in Step 2 with light or rubbing the coating film to perform alignment treatment.

In the present specification, the "coating film immediately after the drying step" refers to irradiating the light immediately after the drying step without carrying out a heat treatment at a temperature of higher than that of the drying step, and further steps other than the heat treatment can be added.

More specifically, when a liquid crystal alignment film is produced using a conventional liquid crystal alignment agent including polyamic acid or polyamic acid ester, it includes a step of irradiating light after essentially performing a high-temperature heat treatment for imidization of polyamic acid. However, when a liquid crystal alignment film is produced using the liquid crystal alignment agent of the one embodiment described above, it does not include the heat treatment step, and light is directly irradiated to perform alignment treatment, and then the alignment-treated coating film is cured by a heat treatment, thereby enabling production of a liquid crystal alignment film having sufficient alignment property and enhanced stability even under low light irradiation energy.

In the alignment treatment step, the light irradiation is performed by irradiating polarized ultraviolet rays having a wavelength of 150 nm to 450 nm. In this case, the intensity of the light exposure may vary depending on the kind of the polymer for a liquid crystal aligning agent, and preferably energy of 10 mJ/cm$^2$ to 10 J/cm$^2$, or energy of 30 mJ/cm$^2$ to 2 J/cm$^2$, may be irradiated.

As for the ultraviolet rays, polarized ultraviolet rays selected among the ultraviolet rays subjected to polarization treatment by a method of passing through or reflecting with a polarizing device using a substrate in which a dielectric anisotropic material is coated on the surface of a transparent substrate such as quartz glass, soda lime glass, soda lime-free glass, etc., a polarizer plate on which aluminum or metal wires are finely deposited, or a Brewster's polarizing device using the reflection of quartz glass, etc., are irradiated to perform the alignment treatment. Herein, the polarized ultraviolet rays may be irradiated perpendicularly to the surface of the substrate, or may be irradiated by forming an angle of incidence toward a specific angle. By this method, the alignment ability of the liquid crystal molecules is imparted to the coating film.

Further, in the alignment treatment step, a rubbing treatment can use a method using a rubbing cloth. More specifically, in the rubbing treatment, the surface of the coating film after the heat treatment step can be rubbed in one direction while rotating a rubbing roller in which a rubbing cloth is attached to a metal roller.

4) Heat-Treating the Alignment-Treated Coating Film (Step 4)

Step 4 is a step of heat-treating the coating film alignment-treated in Step 3.

The heat treatment may be performed by a heating means such as a hot plate, a hot air circulation path, an infrared ray furnace, and the like, and the heat treatment is preferably performed at a temperature of 100° C. to 300° C.

Meanwhile, Step 4 may include 4-1) a step of subjecting the alignment-treated coating film to a low-temperature heat treatment at 200° C. or less; and 4-2) a step of heat-treating and curing the heat-treated coating film at a temperature higher than that of the low-temperature heat treatment.

Generally, it is known that when an epoxy material is contained in a liquid crystal aligning agent, the strength and high voltage holding ratio of an alignment film are enhanced, and that the degree thereof increases as the content of the epoxy material increases. However, when the content of the epoxy material increases, there is a problem that the high-temperature AC brightness fluctuation rate of a liquid crystal cell increases. The reason why the high-temperature AC brightness fluctuation characteristics are deteriorated is not theoretically limited, but it is attributed to the fact that the alignment of the liquid crystal aligning agent and the epoxy reaction are performed simultaneously as the alignment of the liquid crystal aligning agent is performed at a high temperature.

Accordingly, the liquid crystal aligning agent composition is coated onto a substrate and dried to form a coating film, and then directly irradiated with linearly polarized light without an imidization process, to induce initial anisotropy, and then a part of the alignment film is reoriented through a low-temperature heat treatment to stabilize decomposition products. Subsequently, while performing a high-temperature heat treatment at a temperature higher than that of the low-temperature heat treatment to progress the imidization, the alignment stabilization by the epoxy reaction can be achieved at the same time. Accordingly, there are advantages in that, as the initial anisotropy progresses without an epoxy reaction, the content of the epoxy material can be increased while the alignment is effectively performed.

The liquid crystal alignment film prepared according to the method for producing a liquid crystal alignment film as described above is characterized by not only exhibiting excellent alignment properties, but also exhibiting an excellent high-temperature AC brightness fluctuation ratio and maintaining a high voltage holding ratio for a long time.

Specifically, since the initial anisotropy was induced by directly irradiating linearly polarized light without an imidization process in Step 3, Step 4-1 is a step of reorienting a part of the alignment film and stabilizing decomposition products through a low-temperature heat treatment. Further, such a low-temperature heat treatment step is distinguished from a step of heat-treating and curing the alignment-treated coating film which will be described later.

The temperature for the low-temperature heat treatment is a temperature capable of reorienting a part of the alignment film and stabilizing decomposition products without curing the coating film, and is preferably 200° C. or lower. Alternatively, the temperature for the low-temperature heat treatment is 110° C. to 200° C., or 130° C. to 180° C. Herein, the means of the heat treatment is not particularly limited, and may be performed by a heating means such as a hot plate, a hot air circulation path, an infrared ray furnace, and the like.

Step 4-2 is a step of subjecting the coating film, which has been subjected to a low-temperature heat-treated in Step 4-1, to a high temperature-heat treatment to cure it.

The step of heat-treating and curing the alignment-treated coating film is a step that is performed after the irradiation of light even in the conventional method for producing a liquid crystal alignment film using a polymer for a liquid crystal aligning agent including a polyamic acid or polyamic acid ester, and is distinguished from the heat treatment step which is performed for coating the liquid crystal aligning agent composition onto a substrate and then performing imidization of the liquid crystal aligning agent composition before irradiating the light or while irradiating the light.

In addition, the epoxy reaction of the compound having two or more epoxy groups in a molecule is performed during the heat treatment, and thus the alignment stability can be improved. Accordingly, the temperature for the heat treatment is a temperature at which the imidization of the polymer for a liquid crystal aligning agent and the epoxy reaction of the compound having two or more epoxy groups in a molecule are performed, and is preferably higher than the temperature for the low-temperature heat treatment of Step 4-1. The heat treatment of Step 4-2 is preferably performed at a temperature of 200° C. to 250° C., or at a temperature of 210° C. to 240° C. In this case, the means of the heat treatment is not particularly limited and may be performed by a heating means such as a hot plate, a hot air circulation path, an infrared ray furnace, and the like.

Liquid Crystal Alignment Film

Further, the present invention may provide a liquid crystal alignment film prepared in accordance with the method for producing a liquid crystal alignment film described above. Specifically, the liquid crystal alignment film may include an aligned cured product of the liquid crystal aligning agent composition of the one embodiment. The aligned cured product means a material obtained through an alignment step and a curing step of the liquid crystal aligning agent composition of the one embodiment.

As described above, when the first polymer for a liquid crystal aligning agent and the second polymer for a liquid crystal aligning agent are mixed and used, a liquid crystal alignment film having enhanced alignment properties and stability can be prepared. Furthermore, the alignment stability can be enhanced through the epoxy reaction of the compound having two or more epoxy groups in a molecule.

Further, in the liquid crystal alignment film, the imidization reaction of the first polymer or the second polymer is accelerated by the catalyst including at least one selected from the group consisting of a cyclic tertiary amine compound having 1 to 10 hydroxy groups introduced therein, and a linear tertiary amine compound having 2 to 10 hydroxy groups introduced therein, and the imidization conversion rate in the finally prepared liquid crystal alignment film is as high as 90% or more, and thereby the liquid crystal alignment property and stability can be improved.

The thickness of the liquid crystal alignment film is not particularly limited, but for example, it can be freely adjusted within the range of 0.001 μm to 100 μm. If the thickness of the liquid crystal alignment film increases or decreases by a specific value, the physical properties measured in the alignment film may also change by a certain value.

Liquid Crystal Display Device

In addition, the present invention provides a liquid crystal display device including the liquid crystal alignment film described above.

The liquid crystal alignment film may be introduced into a liquid crystal cell by a known method, and likewise, the liquid crystal cell may be introduced into a liquid crystal display device by a known method. The liquid crystal alignment film can be prepared by mixing the polymer essentially including the repeating unit represented by Chemical Formula 1 and the polymer including the repeating unit represented by Chemical Formula 4, thereby achieving excellent stability together with excellent physical properties. Accordingly, a liquid crystal display device which can exhibit high reliability is provided.

Advantageous Effects

According to the present invention, a liquid crystal aligning agent composition capable of securing a high imidization rate under relatively mild curing conditions, minimizing side reactions and thus having excellent stability, a method for producing a liquid crystal alignment film using the same, and a liquid crystal alignment film and a liquid crystal display device using the same can be provided.

DETAILED DESCRIPTION OF THE EMBODIMENTS

The prevention invention will be described in more detail by way of examples. However, these examples are given for illustrative purposes only, and the scope of the invention is not intended to be limited by these examples.

Production Example 1: Synthesis of Diamine

Production Example 1-1) Synthesis of Diamine DA-1

Diamine DA-1 was synthesized according to the following reaction scheme.

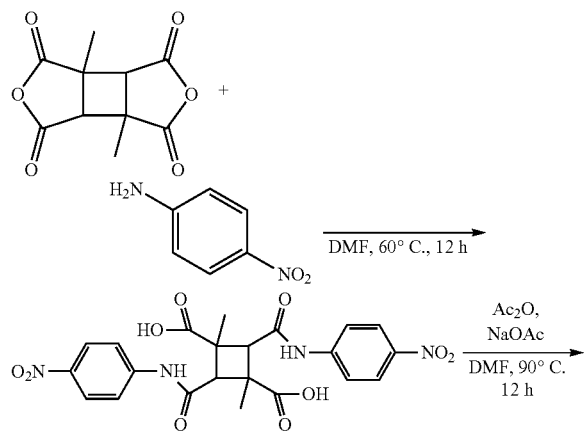

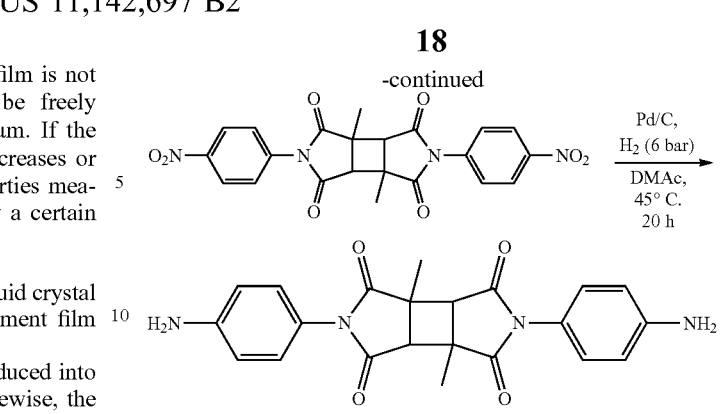

Specifically, 1,3-dimethylcyclobuthane-1,2,3,4-tetracarboxylic dianhydride (DMCBDA) and 4-nitroaniline were dissolved in DMF (dimethylformamide) to prepare a mixture. Then, the mixture was reacted at about 80° C. for about 12 hours to prepare an amic acid. Subsequently, the amic acid was dissolved in DMF, and acetic anhydride and sodium acetate were added thereto to prepare a mixture. Then, the amic acid contained in the mixture was imidized at about 90° C. for about 4 hours. The thus-obtained imide was dissolved in DMAc (dimethylacetamide), and then Pd/C was added thereto to prepare a mixture. The resulting mixture was reduced at 45° C. under hydrogen pressure of 6 bar for 20 minutes to prepare diamine DA-1.

Production Example 1-2) Synthesis of Diamine DA-2

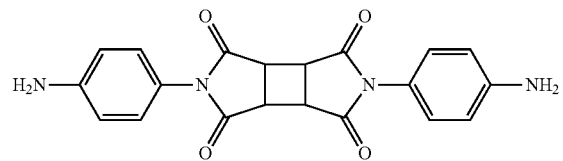 [SMILES: Nc1ccc(N2C(=O)C3C(C2=O)C2C(=O)N(c4ccc(N)cc4)C(=O)C32)cc1]

DA-2 having the above structure was produced in the same manner as in Production Example 1-1, except that cyclobuthane-1,2,3,4-tetracarboxylic dianhydride (CBDA) was used instead of 1,3-dimethylcyclobuthane-1,2,3,4-tetracarboxylic dianhydride.

Production Example 2: Production of Polymer for Liquid Crystal Aligning Agent

Production Example 2-1) Production of Polymer for Liquid Crystal Aligning Agent P-1

(Step 1)

5.0 g (13.3 mmol) of DA-2 produced in Production Example 1-2 was completely dissolved in 71.27 g of anhydrous N-methyl pyrrolidone (NMP). Then, 2.92 g (13.03 mmol) of 1,3-dimethyl-cyclobuthane-1,2,3,4-tetracarboxylic dianhydride (DMCBDA) was added to the solution under an ice bath and stirred at room temperature for 16 hours.

(Step 2)

The solution obtained in Step 1 was poured into an excess amount of distilled water to form a precipitate. Then, the formed precipitate was filtered and washed twice with distilled water and again three times with methanol. The thus-obtained solid product was dried in a vacuum oven at 40° C. for 24 hours to obtain 6.9 g of a polymer for a liquid crystal aligning agent P-1.

As a result of confirming the molecular weight of P-1 through GPC, the number average molecular weight (Mn) was 15,500 g/mol, and the weight average molecular weight (Mw) was 31,000 g/mol. Further, the monomer structure of the polymer P-1 was determined by the equivalent ratio of the monomers used, and the ratio of imine structure in the molecule was 50.5%, while the ratio of amic acid structure was 49.5%.

Production Example 2-2) Production of Polymer for Liquid Crystal Aligning Agent P-2

5.0 g of DA-1 produced in Production Example 1-1 and 1.07 g of p-phenylenediamine (PDA) were completely dissolved in 103.8 g of NMP. Then, 2.12 g of cyclobutane-1,2,3,4-tetracarboxylic dianhydride (CBDA) and 3.35 g of 4,4'-oxydiphthalic dianhydride (OPDA) were added to the solution under an ice bath and stirred at room temperature for 16 hours. The polymer P-2 was then produced in the same manner as in Step 2 of Production Example 2-1.

As a result of confirming the molecular weight of P-2 through GPC, the number average molecular weight (Mn) was 18,000 g/mol, and the weight average molecular weight (Mw) was 35,000 g/mol. Further, as for the polymer P-2, the ratio of the imine structure in the molecule was 36.4%, and the ratio of the amic acid structure was 63.6%.

Production Example 2-3) Production of Polymer for Liquid Crystal Aligning Agent P-3

6.0 g of DA-2 produced in Production Example 1-2 and 1.37 g of 4,4'-oxydianiline (ODA) were completely dissolved in 110.5 g of NMP Then, 3.47 g of DMCBDA and 1.44 g of pyromellitic dianhydride (PMDA) were added to the solution under an ice bath and stirred at room temperature for 16 hours. The polymer P-3 was then produced in the same manner as in Step 2 of Production Example 2-1.

As a result of confirming the molecular weight of P-3 through GPC, the number average molecular weight (Mn) was 14,500 g/mol, and the weight average molecular weight (Mw) was 29,000 g/mol. Further, as for the polymer P-3, the ratio of the imide structure in the molecule was 41.9%, and the ratio of the amic acid structure was 58.1%.

Production Example 2-4) Production of Polymer for Liquid Crystal Aligning Agent Q-1

5.00 g of 4,4'-methylenedianiline and 5.05 g of 4,4'-oxydianiline were completely dissolved in 221.4 g of NMP. Then, 14.55 g of 4,4'-biphthalic anhydride was added to the solution under an ice bath and stirred at room temperature for 16 hours. The polymer Q-1 was then produced in the same manner as in Step 2 of Production Example 2-1.

As a result of confirming the molecular weight of Q-1 through GPC, the number average molecular weight (Mn) was 25,000 g/mol, and the weight average molecular weight (Mw) was 40,000 g/mol.

Example: Production of Liquid Crystal Aligning Agent Composition

Example 1

5 parts by weight of P-1 produced in Production Example 2-1, 5 parts by weight of Q-1 produced in Production Example 2-4, 0.5 parts by weight of (3',4'-epoxycyclohexane)methyl 3,4-epoxycyclohexylcarboxylate (Celloxide 2021P manufactured by Daicel), and 5 parts by weight of (2-hydroxyethyl)piperidine were completely dissolved in a mixed solvent of NMP and n-butoxyethanol at a weight ratio of 8:2. Then, the resultant was subjected to pressure filtration with a filter made of poly(tetrafluoroethylene) having a pore size of 0.2 µm to produce a liquid crystal aligning agent composition.

Example 2

A liquid crystal aligning agent composition was produced in the same manner as in Example 1, except that N,N,N',N'-tetrakis(2-hydroxyethyl)ethylenediamine was used instead of (2-hydroxyethyl)piperidine.

Example 3

A liquid crystal aligning agent composition was produced in the same manner as in Example 1, except that P-2 produced in Production Example 2-2 was used instead of P-1 produced in Production Example 2-1.

Example 4

A liquid crystal aligning agent composition was produced in the same manner as in Example 1, except that P-3 produced in Production Example 2-3 was used instead of P-1 produced in Production Example 2-1.

Comparative Example: Production of Liquid Crystal Aligning Agent Composition

Comparative Example 1

A liquid crystal aligning agent composition was produced in the same manner as in Example 1, except that (2-hydroxyethyl)piperidine was not used.

Comparative Example 2

A liquid crystal aligning agent composition was produced in the same manner as in Example 1, except that Celloxide 2021P was not used.

Comparative Example 3

A liquid crystal aligning agent composition was produced in the same manner as in Example 1, except that Q-1 produced in Production Example 2-4 was used instead of P-1 produced in Production Example 2-1.

Comparative Example 4

A liquid crystal aligning agent composition was produced in the same manner as in Example 1, except that 1,8-diazabicyclo(5.4.0)undec-7-ene (DBU) was used instead of (2-hydroxyethyl)piperidine.

Experimental Example 1

1) Production of Liquid Crystal Cell

A liquid crystal cell was produced by using the liquid crystal aligning agent compositions prepared in the examples and comparative examples.

Specifically, the liquid crystal aligning agent composition produced in the examples and comparative examples was coated onto a substrate (lower plate) in which comb-shaped IPS (in-plane switching) mode ITO electrode patterns having a thickness of 60 nm, an electrode width of 3 μm, and a spacing between electrodes of 6 μm were formed on a rectangular glass substrate having a size of 2.5 cm×2.7 cm and onto a glass substrate (upper plate) having no electrode pattern each using a spin coating method.

Then, the substrates onto which the liquid crystal aligning agent composition was coated were placed on a hot plate at about 70° C. for 3 minutes to evaporate the solvent. In order to subject the thus-obtained coating film to alignment treatment, ultraviolet rays of 254 nm were irradiated with an intensity of 1 J/cm$^2$ using an exposure apparatus in which a linear polarizer was adhered to the coating film of each of the upper and lower plates.

Thereafter, the coating film was calcinated (cured) in an oven at about 230° C. for 30 minutes to obtain a coating film having a thickness of 0.1 μm. Then, a sealing agent impregnated with a ball spacer having a size of 3 μm was applied to the edge of the upper plate excluding the liquid crystal injection hole. Subsequently, the alignment films formed on the upper plate and the lower plate were aligned such that they faced each other and the alignment directions were aligned with each other, and then the upper and lower plates were bonded together and the sealing agent was cured to prepare an empty space. Then, a liquid crystal was injected into the empty cells to produce an IPS mode liquid crystal cell.

2) Imidization Conversion Rate (%)

The FT-IR spectra of the liquid crystal alignment films obtained from the liquid crystal aligning agent compositions of the examples and comparative examples were measured by an ATR method, and the ratio of imide structure in the polymer molecules contained in the alignment film was measured.

3) Evaluation of Liquid Crystal Alignment Properties

Polarizers were attached to the upper and lower substrates of the liquid crystal cell produced by the above method so that they were perpendicular to each other. The polarizer-attached liquid crystal cell was then placed on a backlight with brightness of 7000 cd/m$^2$, and light leakage was observed with the naked eye. At this time, if the alignment properties of the liquid crystal alignment film are excellent and the liquid crystal is arranged well, light is not passed through the upper and lower polarizing plates attached vertically to each other, and it is observed as dark without defects. In this case, the alignment properties was evaluated as 'good', and when light leakage such as a liquid crystal flow mark or bright spot is observed, it was evaluated as 'poor'. The results are shown in Table 1 below.

4. Evaluation of Alignment Film Strength

The alignment films obtained from the liquid crystal aligning agent compositions produced in the examples and comparative examples were subjected to rubbing treatment while rotating the surface of the alignment film at 850 rpm using a rubbing machine (SHINDO Engineering), and then the haze value was measured using a haze meter. The difference between the haze value after rubbing treatment and the haze value before rubbing treatment was calculated as shown in the following Equation 1 to evaluate the film strength. If the change in haze values is less than 1, it was evaluated that the film strength is excellent.

$$\text{Film strength (\%)} = \text{Haze of the liquid crystal alignment film after rubbing treatment (\%)} - \text{Haze of the liquid crystal alignment film before rubbing treatment (\%)} \quad \text{[Equation 1]}$$

5) Storage Stability

For the liquid crystal aligning agent compositions of Example 1, Example 2, and Comparative Example 4, the initial viscosity and the viscosity after storage at room temperature for 30 days were respectively measured, and the viscosity change rate was measured according to the following Equation 2. When the change in viscosity over 30 days is 10% or less, it was evaluated that the storage stability is excellent.

The viscosity of the liquid crystal aligning agent composition may be determined by measuring the amount of torque using a Brookfield viscometer with an RV-7 spindle at a temperature of 25° C. and a rotational speed of 0.5 rpm.

$$\text{Viscosity change rate (\%)} = (\text{Viscosity of the liquid crystal aligning agent composition after storage at room temperature for 30 days} - \text{Initial viscosity of the liquid crystal aligning agent composition}) / \text{Initial viscosity of the liquid crystal aligning agent composition} * 100 \quad \text{[Equation 2]}$$

Experimental Example 2

1) Production of Liquid Crystal Cell

A liquid crystal cell was produced in the same manner as in Experimental Example 1, except that a step of placing the coating film on a hot plate at 130° C. for 500 seconds to perform a low-temperature heat treatment is further included, before calcinating (curing) the coating film in an oven at about 230° C. for 30 minutes.

TABLE 1

Results of measurement of examples and comparative examples

| Class | Example 1 | Example 2 | Example 3 | Example 4 | Comparative Example 1 | Comparative Example 2 | Comparative Example 3 | Comparative Example 4 |
|---|---|---|---|---|---|---|---|---|
| Polymer | Production Example 2-1 Production Example 2-4 | Production Example 2-1 Production Example 2-4 | Production Example 2-2 Production Example 2-4 | Production Example 2-3 Production Example 2-4 | Production Example 2-1 Production Example 2-4 | Production Example 2-1 Production Example 2-4 | Production Example 2-4 | Production Example 2-1 Production Example 2-4 |
| Catalyst | 2-hydroxyethyl) piperidine | N,N,N',N'-tetrakis(2-hydroxyethyl) ethylene diamine | (2-hydroxyethyl) piperidine | (2-hydroxyethyl) piperidine | — | (2-hydroxyethyl) piperidine | (2-hydroxyethyl) piperidine | DBU |

TABLE 1-continued

Results of measurement of examples and comparative examples

| Class | Example 1 | Example 2 | Example 3 | Example 4 | Comparative Example 1 | Comparative Example 2 | Comparative Example 3 | Comparative Example 4 |
|---|---|---|---|---|---|---|---|---|
| Epoxy additive | Celloxide 2021P | Celloxide 2021P | Celloxide 2021P | Celloxide 2021P | Celloxide 2021P | — | Celloxide 2021P | Celloxide 2021P |
| Imidization rate(%) | 94.1 | 93.3 | 93.0 | 92.5 | 80.5 | 91 | 83 | 90.1 |
| Alignment properties | Good | Good | Good | Good | Good | Poor | Poor | Good |
| Film strength (%) | 0.6 | 0.73 | 0.62 | 0.53 | 1.46 | 5.30 | 2.20 | 1.00 |
| Viscosity change (%) | 5.3 | 6.4 | — | — | — | — | — | 25.1 |

As shown in Table 1, the liquid crystal aligning agent compositions of the examples containing the polymer synthesized in Production Example 2-1, an epoxy additive, and (2-hydroxyethyl)piperidine or N,N,N',N'-tetrakis(2-hydroxyethyl)ethylenediamine as a catalyst exhibited a very high imidization rate of 90% or more even at a curing temperature of 230° C. Thus, in the liquid crystal cell produced from the liquid crystal aligning agent composition of the examples, excellent alignment properties were exhibited and simultaneously a change in haze values before and after the rubbing treatment was very low, i.e., less than 1, indicating that the film strength performance was improved.

In particular, in the case of the liquid crystal aligning agent compositions of Examples 1 and 2, as a tertiary amine catalyst having a specific structure was used, the storage stability of the liquid crystal aligning agent composition was shown to be 5.3% and 6.4%, respectively, and therefore the stability of the liquid crystal aligning agent composition was greatly improved and also the final liquid crystal alignment film after the heat treatment step could secure excellent alignment properties and rubbing resistance. On the contrary, in the case of the liquid crystal aligning agent composition of Comparative Example 4, as a DBU compound which had been used as a conventional catalyst was used, it was confirmed that the storage stability of the liquid crystal aligning agent composition was 25.1%, which was greatly increased as compared with that of the examples, so the stability was decreased.

On the other hand, in the case of the alignment film obtained from the liquid crystal aligning agent composition of Comparative Example 1 containing no catalyst, it was confirmed that the imidization rate at a curing temperature of 230° C. appeared to be 80.5%, which was reduced as compared with that of the examples.

In addition, in the case of the alignment film obtained from the liquid crystal aligning agent composition of Comparative Example 2 containing no epoxy additive, it was confirmed that the change in haze values before and after the rubbing treatment was greatly increased to 5.3%, so the film strength was remarkably poor as compared with the examples.

Further, it was confirmed that the alignment film obtained from the liquid crystal aligning agent composition of Comparative Example 3 containing no polymer synthesized in Production Example 2-1 was significantly poorer in alignment properties as compared with the examples.

The invention claimed is:

1. A liquid crystal aligning agent composition comprising:

i) a first polymer for a liquid crystal aligning agent including two or more repeating units selected from the group consisting of a repeating unit represented by Chemical Formula 1, a repeating unit represented by Chemical Formula 2, and a repeating unit represented by Chemical Formula 3, wherein the first polymer includes the repeating unit represented by Chemical Formula 1 in an amount of 5 mol % to 74 mol % with respect to a total of the repeating units represented by the Chemical Formulae 1 to 3, ii) a second polymer for a liquid crystal aligning agent including a repeating unit represented by Chemical Formula 4, iii) a compound having two or more epoxy groups in a molecule, and iv) a catalyst including at least one selected from the group consisting of a cyclic tertiary amine compound having 1 to 10 hydroxy groups, and a linear tertiary amine compound having 2 to 10 hydroxy groups, wherein the cyclic tertiary amine compound having 1 to 10 hydroxy groups introduced therein includes a nitrogen-containing heteroalicyclic compound containing one or more nitrogen atoms and wherein the heteroalicyclic compound contains 1 to 10 hydroxyalkyl groups each bonded to a nitrogen:

[Chemical Formula 1]

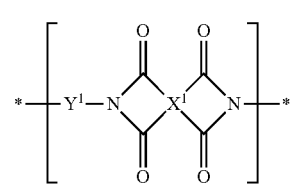

[Chemical Formula 2]

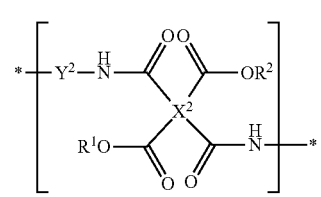

-continued

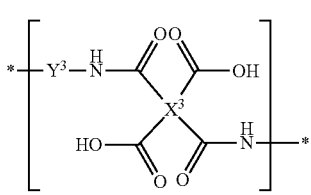
[Chemical Formula 3]

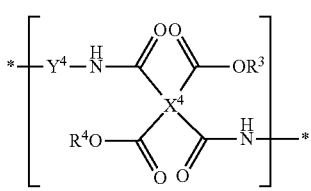
[Chemical Formula 4]

wherein, in Chemical Formulae 1 to 4,
at least one of $R^1$ and $R^2$ is a $C_{1-10}$ alkyl, and the rest is hydrogen,
$R^3$ and $R^4$ are each independently hydrogen or $C_{1-10}$ alkyl,
$X^1$ is a tetravalent organic group represented by Chemical Formula 5,
$X^2$, $X^3$, and $X^4$ are each independently a tetravalent organic group derived from a hydrocarbon having 4 to 20 carbon atoms, or a tetravalent organic group in which at least one H in the tetravalent organic group is substituted with a halogen, or at least one —$CH_2$— is replaced by —O—, —CO—, —S—, —SO—, —$SO_2$—, or —CONH— such that oxygen or sulfur atoms are not directly linked, and

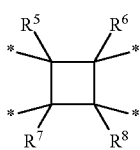
[Chemical Formula 5]

wherein, in Chemical Formula 5,
$R^5$ to $R^8$ are each independently hydrogen or a $C_{1-6}$ alkyl,
$Y^1$, $Y^2$, $Y^3$ and $Y^4$ are each independently a divalent organic group represented by Chemical Formula 6,

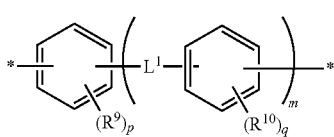
[Chemical Formula 6]

wherein, in Chemical Formula 6,
$R^9$ and $R^{10}$ are each independently a halogen, a cyano, a $C_{1-10}$ alkyl, a $C_{2-10}$ alkenyl, a $C_{1-10}$ alkoxy, a $C_{1-10}$ fluoroalkyl, or a $C_{1-10}$ fluoroalkoxy,
p and q are each independently an integer between 0 and 4, and
$L^1$ is a single bond, —O—, —CO—, —S—, —$SO_2$—, —$C(CH_3)_2$—, —$C(CF_3)_2$—, —CONH—, —COO—, —$(CH_2)_z$—, —$O(CH_2)_zO$—, —$O(CH_2)_z$—, —$OCH_2$—$C(CH_3)_2$—$CH_2O$—, —COO(—$CH_2)_z$—OCO—, or —OCO—$(CH_2)_z$—COO—,
wherein z is an integer between 1 and 10, and
m is an integer between 0 and 3.

2. The liquid crystal aligning agent composition of claim 1, wherein the nitrogen-containing heteroalicyclic compound containing one or more nitrogen atoms contains 1 to 4 hydroxyalkyl groups each bonded to a nitrogen.

3. The liquid crystal aligning agent composition of claim 1, wherein the cyclic tertiary amine compound having 1 to 10 hydroxy groups introduced therein is (2-hydroxyethyl)piperidine.

4. The liquid crystal aligning agent composition of claim 1, wherein the linear tertiary amine compound having 2 to 10 hydroxy groups introduced therein includes an alkylene diamine compound in which 1 to 2 hydroxyalkyl groups are bonded to each nitrogen.

5. The liquid crystal aligning agent composition of claim 4, wherein the alkylene diamine compound in which 1 to 2 hydroxyalkyl groups are bonded to each nitrogen includes an ethylene diamine in which 1 to 2 hydroxyalkyl groups are bonded to each nitrogen.

6. The liquid crystal aligning agent composition of claim 1, wherein the linear tertiary amine compound having 2 to 10 hydroxy groups introduced therein is N,N,N',N'-tetrakis(2-hydroxyethyl)ethylenediamine.

7. The liquid crystal aligning agent composition of claim 1, wherein the $X^2$, $X^3$, and $X^4$ are each independently a tetravalent organic group represented by Chemical Formula 7:

[Chemical Formula 7]

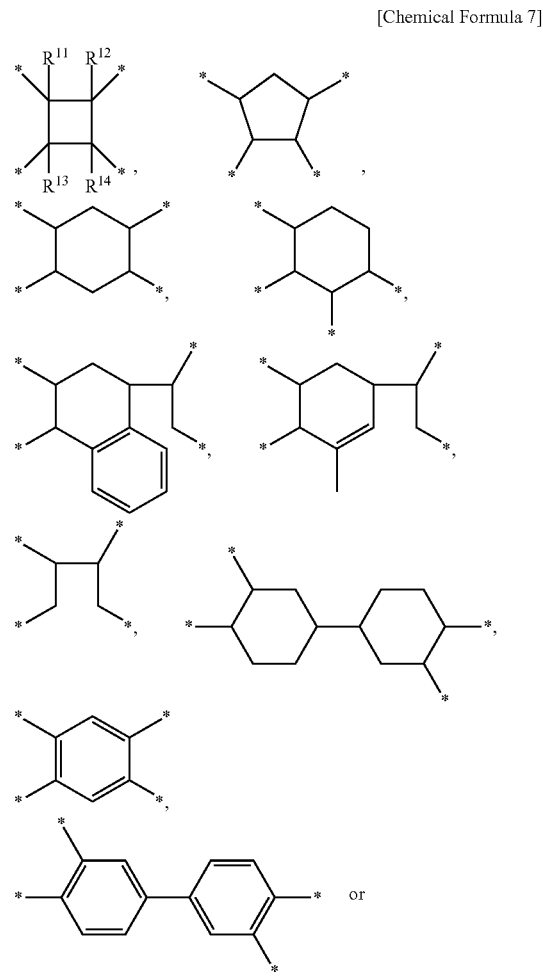

or

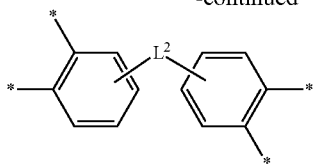

wherein, in Chemical Formula 7,
$R^{11}$ to $R^{14}$ are each independently hydrogen or a $C_{1-6}$ alkyl, and $L^2$ is a single bond, —O—, —CO—, —S—, —C(CH$_3$)$_2$—, —C(CF$_3$)$_2$—, —CONH—, —COO—, —(CH$_2$)$_z$—, —O(CH$_2$)$_z$O—, or —COO—(CH$_2$)$_z$—OCO —, wherein z is an integer between 1 to 10.

8. The liquid crystal aligning agent composition of claim 1, wherein a weight ratio between the first polymer for a liquid crystal aligning agent and the second polymer for a liquid crystal aligning agent is 1:9 to 9:1.

9. The liquid crystal aligning agent composition of claim 1, wherein the molecular weight of the compound having two or more epoxy groups in a molecule is 100 g/mol to 10,000 g/mol.

10. The liquid crystal aligning agent composition of claim 1, wherein the compound having two or more epoxy groups in a molecule is a cycloaliphatic-based epoxy, a bisphenol-based epoxy, or a novolac-based epoxy.

11. The liquid crystal aligning agent composition of claim 1, wherein the compound having two or more epoxy groups in a molecule is included in an amount of 0.1 parts by weight to 30 parts by weight based on a total of 100 parts by weight of the first polymer for a liquid crystal aligning agent and the second polymer for a liquid crystal aligning agent.

12. A method for producing a liquid crystal alignment film comprising the steps of:
1) coating the liquid crystal aligning agent composition of claim 1 onto a substrate to form a coating film;
2) drying the coating film;
3) subjecting the coating film to alignment treatment immediately after the drying step; and
4) heat-treating and curing the alignment-treated coating film.

13. The method for producing a liquid crystal alignment film of claim 12, wherein the liquid crystal aligning agent composition is dissolved or dispersed in an organic solvent.

14. The method for producing a liquid crystal alignment film of claim 12, wherein the drying of Step 2 is performed at a temperature of 50° C. to 130° C.

15. The method for producing a liquid crystal alignment film of claim 12, wherein Step 4 comprises the steps of:
4-1) subjecting the alignment-treated coating film to a low-temperature heat treatment at 200° C. or less; and
4-2) heat-treating and curing the heat-treated coating film at a temperature of higher than that of the low-temperature heat treatment.

16. The method for producing a liquid crystal alignment film of claim 15, wherein the low-temperature heat treatment of Step 4-1 is performed at a temperature of 110° C. to 200° C.

17. The method for producing a liquid crystal alignment film of claim 15, wherein the heat treatment of Step 4-2 is performed at a temperature of 200° C. to 250° C.

18. A liquid crystal alignment film comprising an aligned and cured product of the liquid crystal aligning agent composition of claim 1.

19. A liquid crystal display device comprising the liquid crystal alignment film of claim 18.

* * * * *